United States Patent [19]
Bylander et al.

[11] Patent Number: 5,732,173
[45] Date of Patent: Mar. 24, 1998

[54] MICROREPLICATED OPTICAL MODULE

[75] Inventors: James R. Bylander; James B. Carpenter, both of Austin; Donald G. Doss, Round Rock; Douglas P. Hills, Cedar Park; Richard A. Patterson, Georgetown; Laura A. Weller-Brophy, Austin, all of Tex.

[73] Assignee: Minnesota Mining and Manufacturing Company, St. Paul, Minn.

[21] Appl. No.: 764,034

[22] Filed: Dec. 12, 1996

Related U.S. Application Data

[63] Continuation of Ser. No. 370,581, Jan. 9, 1995, abandoned.
[51] Int. Cl.[6] .................................... G02B 6/30
[52] U.S. Cl. .................... 385/49; 385/83; 385/45
[58] Field of Search ........................ 385/49, 46, 45, 385/48, 51, 88, 52, 95, 97, 98, 99, 83

[56] References Cited

U.S. PATENT DOCUMENTS

| | | | |
|---|---|---|---|
| 5,015,059 | 5/1991 | Booth et al. | 385/88 |
| 5,113,460 | 5/1992 | hakoun et al. | 385/88 |
| 5,155,787 | 10/1992 | Carpenter et al. | 385/98 |
| 5,175,781 | 12/1992 | Hockaday et al. | 385/49 |
| 5,197,109 | 3/1993 | Ichigi et al. | 385/50 |
| 5,199,093 | 3/1993 | Longhurst | 385/88 |
| 5,231,683 | 7/1993 | Hockaday et al. | 385/49 |
| 5,265,184 | 11/1993 | Lebby et al. | 385/132 |
| 5,276,755 | 1/1994 | Longhurst | 385/98 |
| 5,309,538 | 5/1994 | Larson | 385/98 |
| 5,311,604 | 5/1994 | Rogner et al. | 385/14 |
| 5,343,544 | 8/1994 | Boyd et al. | 385/46 |
| 5,444,804 | 8/1995 | Yui et al. | 385/49 |

FOREIGN PATENT DOCUMENTS

| | | | |
|---|---|---|---|
| 0 560 043 A2 | 9/1993 | European Pat. Off. | |
| 560043A2 | 9/1993 | European Pat. Off. | G02B 6/12 |
| 4217553A | 12/1993 | Germany | G02B 6/30 |
| PCT/DE93/ 00248 | 10/1993 | WIPO | |
| WO93/21550 | 10/1993 | WIPO | G02B 6/30 |

*Primary Examiner*—John Ngo
*Attorney, Agent, or Firm*—Gerald F. Chernivec; John C. McFarren

[57] ABSTRACT

An optical module for interconnecting two or more optical fibers has a microreplicated waveguide element which is integrally formed on the same substrate with a splice element. In one embodiment, the module has three plates, a bottom plate, a cover plate, and a top plate, all contained within a common housing. The bottom plate has fiber-receiving grooves and fiber alignment grooves at its ends, the fiber alignment grooves being aligned with waveguide channels formed on the central portion of the bottom plate. The cover plate is used when forming the cores of the waveguide channels, to force residual curable, waveguide material into flow channels adjacent the waveguide channels, and this material, when cured, adheres the bottom and cover plates together. The top plate is used to clamp fibers which are held in the fiber alignment grooves, with the center of the fibers aligned with the core of the waveguide channels. The module housing includes wedges which may be independently actuated to secure the fibers, in a remateable fashion, to either end of the module.

23 Claims, 8 Drawing Sheets

MICROREPLICATED OPTICAL MODULE

This is a continuation of application Ser. No. 08/370581 filed Jan. 9, 1995 now abandoned.

BACKGROUND OF THE INVENTION

1. Field of the Invention

The present invention generally relates to devices for operatively connecting the ends of waveguides such as optical fibers, and more particularly to an article which interconnects at least one optical fiber to at least one other optical fiber and has a microreplicated, planar structure with optical waveguides formed therein.

2. Description of the Prior Art

With the wide commercialization of optical fiber networks, it has become increasingly important to provide optical interconnection devices which are not only easy to use and reliable, but which may further be manufactured inexpensively in mass quantities. Optical splitters are of particular interest since they allow a single (input) fiber to be interconnected with a plurality of(output) fibers, or allow optical signals from multiple input fibers to be merged into a single waveguide. Splitters play an important role in the use of optical fibers for telecommunications, cable television and data transmission.

Optical splitters are commonly made by fusing optical fibers, or by permanently attaching the fibers to a planar, glass integrated optical device which guides the light from input fibers to output fibers (pigtailing). Pigtailing is a critical step in the manufacture of planar glass integrated optical devices since the device cost is proportionate to the number of fiber attachments desired. The pigtailing step includes both the alignment of the optical fiber waveguide paths with the ion-diffused or channel waveguide paths in the splitter, and the attachment of the fiber pigtail ends at the component end face. Alignment must be very precise, and the attachment must assure the stability of the alignment during environmental variations. Precise alignment is often difficult, especially for single-mode waveguides whose core diameters are on the order of 8 microns. This labor-intensive pigtailing process prohibits planar integrated optical devices from being mass produced with economy.

To reduce the cost of actively aligning optical fibers to an optical waveguide device or coupler, it is known that the optical fibers may first be inserted into and permanently attached to a fiber aligning substrate which subsequently is aligned and permanently attached to the optical waveguide substrate. Economy results from the alignment of a plurality of optical fibers in one step. This method of fiber attachment requires the permanent attachment of the fibers to the optical waveguide device, and further requires polishing of the fiber aligning substrate and optical waveguide substrate prior to their attachment to each other. See U.S. Pat. No. 5,197,109.

A process for producing optical polymer components with an integrated fiber-chip coupling mechanism is disclosed in Patent Cooperation Treaty Application No. WO 93/21550. This application teaches a process for fabricating integrated optic components through the molding of polymeric materials. Fiber guiding grooves are molded in precise registry with the integrated optical channel waveguides providing for the passive alignment of optical fiber pigtails to the channel waveguide device. The application further describes a process wherein the glass fiber ends are placed into positioning grooves in the molded polymeric components and the openings are filled with a polymerizable monomer. With a cover plate applied, the material is polymerized in situ. The application fails to describe a method for quickly or reliably splicing or connecting a plurality of fibers to the microreplicated waveguide device, nor does it teach any sort of housing enclosing or supporting the microreplicated device.

A similar method for the production of optically integrated waveguides with fiber-guidance structures, and employing the molding of polymeric materials, is depicted in U.S. Pat. No. 5,311,604. That invention relates to the simultaneous production of optically integrated waveguides and micro-mechanical components for fiber guidance. An optical substrate contains at least one polymeric waveguide structure, transferred in the form of recesses by molding a polymeric substrate. The recesses are filled with a material having a higher refractive index than the substrate. An optical substrate containing at least one waveguide structure with at least one fiber-guidance structure in polymers is also disclosed. Fiber attachment is achieved by the same mechanism employed in WO 93/21550, wherein the optical fiber ends are placed into positioning grooves in the molded polymeric components. A method is further described for the coupling of fibers to the optically integrated waveguide by inserting the fibers into the fiber guidance recesses; a cover plate is attached, extending over the fiber guiding recesses. The means for providing a low-loss, low back reflection connection between the optical fibers and channel waveguides is not taught, nor is any means taught for holding the optical fibers in precise fixed orientation with respect to the channel waveguides. In another aspect of that invention, the fibers are inserted into the guidance grooves and the openings are filled with a polymerizable monomer; with a cover plate applied, the material is again polymerized in situ. The method of fiber attachment is again permanent and requires a clean room environment to eliminate the possibility of contamination of the waveguide channels during application of the high refractive index polymerizable material. Field installation is thus quite difficult if not impossible. The '604 patent also fails to teach a method for quickly or reliably splicing or connecting a plurality of fibers to the microreplicated waveguide device in a remateable fashion, nor does the application teach a housing enclosing or supporting the device.

European Patent Application 560,043 discloses a method for producing planar waveguide elements for optical fiber networks, and components according to this method. The application claims a method for the production of passive, integrated optic components from polymeric materials, consisting at least of a molded part with channels for the optical waveguides and fiber-guidance grooves, and at least one coupled fiber-like optical waveguide. The optical fibers may be coupled to the integrated waveguide by inserting the fibers into the fiber guides, with the cover plate extending over the recesses for the fiber guides and the fibers, and pressing the fibers into the recesses. No means is taught for providing a low-loss, low back reflection connection between the optical fibers and the channel waveguides, nor is any means discussed for holding the optical fibers in precise fixed orientation with respect to the channel waveguides. This patent discusses another method of inserting the optical fibers into the fiber guides whereby the fibers are fixed in their position by the polymerizable material that is filled into the waveguide channels. This technique suffers from the same difficulties inherent in the device of the '604 patent regarding field installation. The European application again fails to teach a method for quickly or reliably splicing or connecting a plurality of fibers to the microreplicated waveguide device in a remateable fashion, or a housing enclosing or supporting the device.

German Patent Application 4,217,553 teaches a method for pigtailing optical fibers to an integrated optical component microreplicated in polymeric materials. The polymeric waveguide element incorporates fiber aligning V-grooves molded in precise registration with the waveguide channels. The fibers to be attached are clamped in an assembly with the fiber ends protruding from an end surface. This mounting assembly with the protruding fiber ends is placed over the fiber alignment V-grooves in the waveguide element and then lowered into the V-grooves, pressed and fixed into the correct position. A polymerizable monomer is applied to the molded waveguide channels, flowing to contact the optical fibers, and polymerized, simultaneously forming the channel waveguide cores and polymerizing the fibers in place. This method of fiber attachment is permanent and requires a clean room environment to eliminate the possibility of contamination of the waveguide channels during application of the high refractive index polymerizable material; this again renders field installation practically impossible. Additionally, the method of fiber insertion via the mounting assembly requires the fibers all to be cut to a precise length with a tolerance of less than 10 microns. The '553 application does not teach a method for remateably attaching the optical fibers, nor does it result in a low insertion loss, low back-reflection connection of the fibers to the molded waveguide article.

An optical fiber connector part comprising a body of molded polymeric materials and at least one discrete passive integrated optical chip permanently encapsulated within the polymeric material of the body is disclosed in U.S. Pat. No. 5,276,755. This patent teaches the encapsulation of a pigtailed integrated optics chip in the polymeric body of the connector. It does not teach a method for remateably connecting or splicing fiber pigtails to the integrated optics chip itself, nor does it teach a connectorized or spliced article which permits a splice or remateable connection directly to the chip, without the use of a permanently attached fiber pigtail. The '755 patent further does not teach a method or article for obtaining a low loss, low back-reflection optical connection between the optical fibers and molded channel waveguides.

A molded waveguide splitter is shown in U.S. Pat. No. 5,265,184 having grooves providing for the alignment of a fiber ribbon connector to a molded waveguide device. This reference also fails to teach any means for providing a low loss, low back-reflection connection between the optical fibers and channel waveguides, or any means for holding the optical fibers in precise fixed orientation with respect to the channel waveguides. The precision with which the connector is aligned to the molded waveguide device is dictated by the accuracy with which the alignment features are molded on both the waveguide device and the fiber ribbon connector. In addition, the relative spacings of the individual fibers in the ribbon dictate the accuracy with which optical connections between the fibers and channel waveguides are made. The '184 patent does not teach a means for aligning optical fibers to channel waveguides with submicron accuracy (required for single mode applications), or does it teach the molding of fiber aligning V-grooves or fiber entry channels in precise alignment with molded waveguide channels. There is a lack of any disclosure of a housing for the connector.

It would, therefore, be desirable and advantageous to devise an optical waveguide element integrated with high performance multifiber splices or connectors for the remateable field installation of multiple optical fibers to an integrated optic device. Such a device would obviate the need to pigtail the optical waveguide device prior to field installation, effectively reducing the opportunity for fiber damage, and keeping fiber handling to a minimum. The integration of a high performance multifiber splice or connector on the microreplicated waveguide device would further allow the facile and economical replacement or upgrading of the waveguide device.

SUMMARY OF THE INVENTION

The present invention provides an optical module generally comprising an optical waveguide element integrated on a common substrate with one or more optical fiber splices or connectors. The optical module may be adapted to provide a plurality of different functions, including but not limited to an n×m Y-branch coupler or splitter, a star coupler, a wavelength division multiplexer, an attenuator, an optical filter, a phase modulator and an optical tap. The preferred embodiment of the optical module has an optical waveguide element integrally microreplicated with fiber-alignment grooves and fiber-receiving channels formed using polymer, halogenated polymer, polymer/ceramic composite, or ceramic materials including transparent, optical quality glasses and silicon. The module is provided with a body or housing surrounding the waveguide element.

In the n×m coupler embodiment of the present invention, the element has n fiber-receiving grooves and n fiber alignment grooves, n waveguide channels which divide or converge into m waveguide channels, and m fiber alignment grooves and m fiber-receiving grooves, where n and m are, independently, integers from 1 to 1,024 inclusive, the n fiber alignment grooves and m fiber alignment grooves being fashioned so that the cores of optical fibers held therein are properly aligned with the ends of the corresponding waveguide channels.

In one embodiment, the molded splice body surrounding the waveguide element consists of a jacket portion and a cap portion which interlock to hold the waveguide element. The waveguide element is comprised of three generally flat plates, a bottom plate having fiber-receiving grooves in line with fiber alignment grooves and corresponding waveguide channels, a cover plate, and a top plate with a recess for the cover plate. The bottom and cover plates are attached to each other through the application of a polymerizable material which simultaneously forms the channel waveguide cores and adheres the bottom and cover plates together. Through the precise filling of the waveguide channels with this polymerizable material, which is preferably of larger refractive index than the waveguide element plates, optical conduction through the waveguide channels is provided.

The waveguide element is assembled, with the top plate loosely fit over the bottom/cover assembly, prior to fiber insertion and actuation by a wedge mechanism. Fibers which are stripped and cleaved are inserted into the fiber insertion grooves, travel into the fiber alignment grooves, and stop as they are forcibly urged against the waveguide channels. The wedge mechanism is actuated to force the bottom and top plates to clamp the fibers in alignment with the channel waveguides. The clamping force is preferentially applied primarily to the fiber/channel interface. A low insertion loss connection results through the precisely molded and self-aligned fiber grooves and waveguide channels. A low return loss mechanical connection of the fibers to the channel waveguides is achieved by virtue of the close matching of the indices of the optical fiber materials and the materials used in the microreplicated optical waveguide element. In addition, low back reflection is obtained through one or more of the follow mechanisms: (i) molding an angled interface at the fiber-channel connection; (ii) intimately contacting the optical fibers with the microreplicated waveguide channels so that no air interface is formed; or (iii) applying index matching material at the fiber-channel connection. The angled interface is preferably used with either of the other two mechanisms to achieve back reflections of −50 to −60 dB.

A stacked waveguide element may be provided in the splice body having more than the bottom, cover and top plates, e.g., a plate stack accommodating two layers of waveguide elements. Special guides positioned at each end of the plates may be used to direct some fibers upward to one waveguide layer and others downward to the other layer. End covers are provided to protect the waveguide element and exposed fibers, and to provide an environmental seal.

BRIEF DESCRIPTION OF THE DRAWINGS

The invention will best be understood by reference to the accompanying drawings, wherein.

DESCRIPTION OF THE PREFERRED EMBODIMENT

Figure 1:
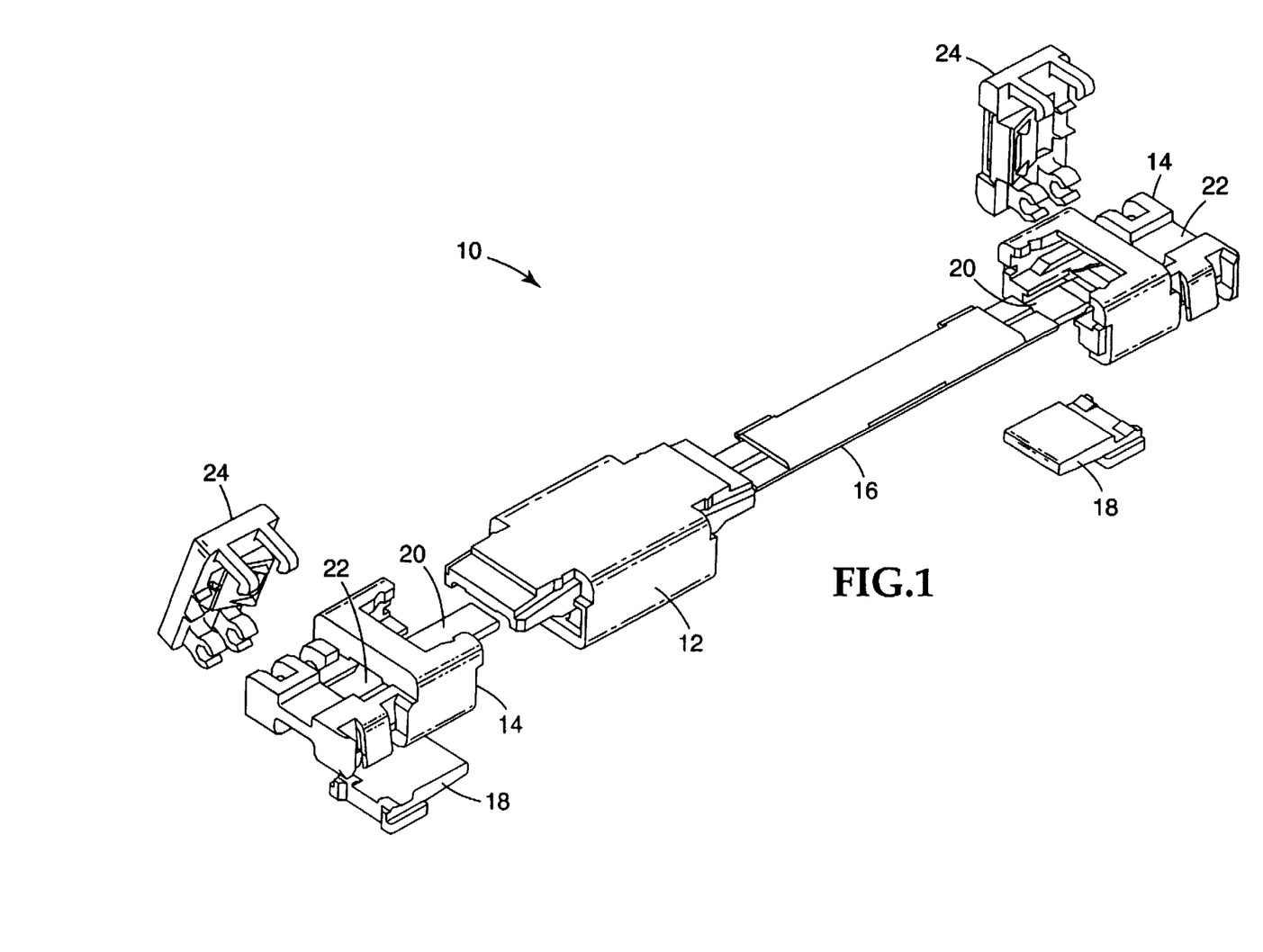
FIG. 1 is an exploded perspective view of one embodiment of the micoreplicated optical module of the present invention, depicting a waveguide element integrally microreplicated with a wedge-actuated optical fiber splice.

With reference now to the figures, and in particular with reference to FIG. 1, there is depicted one embodiment 10 of the optical coupler of the present invention. Coupler 10 is generally comprised of a housing, composed of a jacket 12 and caps 14, and an integrated splice/waveguide element 16. The housing is similar to that shown in U.S. Pat. No. 5,155,787 (incorporated herein), and each of its components is preferably constructed of a durable, injection-moldable polymer such as the liquid crystal polymer sold by Celanese under the brand name VECTRA. Jacket 12 has a longitudinal slot therein, generally rectangular in cross-section, for receiving element 16. Jacket 12 is shorter than element 16, however, such that the ends of element 16 protrude into caps 14 when coupler 10 is fully assembled. One side of the interior slot (underneath jacket 12 in FIG. 1 and not visible) has an opening or openings which accommodate two actuation wedges 18. These wedges are held in place by caps 14 and, when moved from an unactuated state to an actuated state, result in a clamping force exerted on element 16. Tongues 20, extending from caps 14, are interposed between the respective wedges and element 16 to reduce frictional engagement between the wedges and the splice/waveguide element. Jacket 12 may have an insert-molded, reinforcement tube, surrounding the slot which receives element 16, as taught in U.S. Pat. No. 5,309,538 (incorporated herein). Jacket 12 and caps 14 define many overlapping surfaces which impart additional environmental sealing and further inhibit separation of these components caused by stresses such as bending of the housing. Caps 14 also have a slot for receiving a portion of element 16, and further have land areas 22 which accommodate the distal ends of element 16 and provide access to the fiber-receiving grooves discussed below. End covers 24 provide an environmental seal about the ends of the coupler. End covers 24 may be hingedly attached along one side to caps 14 and have hooks or other means to secure the covers in a closed position. A sealant material such as index matching gel may be placed in end covers 24 in such a manner that the sealant escapes and is directed toward the splice areas when the covers are moved to their closed position.

As suggested by its name, splice/waveguide element 16 includes features which act as a splice element and as a waveguide element, yet these features are integrated onto a common substrate. In coupler 10, it may be said that there are two splices, one at each end thereof, while the central portion of element 16 constitutes a waveguide element. The term "splice" is often used to refer to the permanent interconnection of two optical waveguides, as opposed to a "connector" which provides for remateable interconnection. As used herein, however, the term "splice" should not be construed in such a limiting sense; indeed, the preferred embodiment contemplates splice means at each end of the coupler which allow for the remateable connection of the fibers. Similarly, the term "coupler" is sometimes used for a specific type of connector which has at least one Y-branch, but as used herein it more generally refers to any device which provides some amount of optical continuity between the ends of at least two optical fibers. The term "interconnect" means plain (straight-through) connections, as well as other types of optical devices such as splitters, attenuators, etc.

Figure 2:
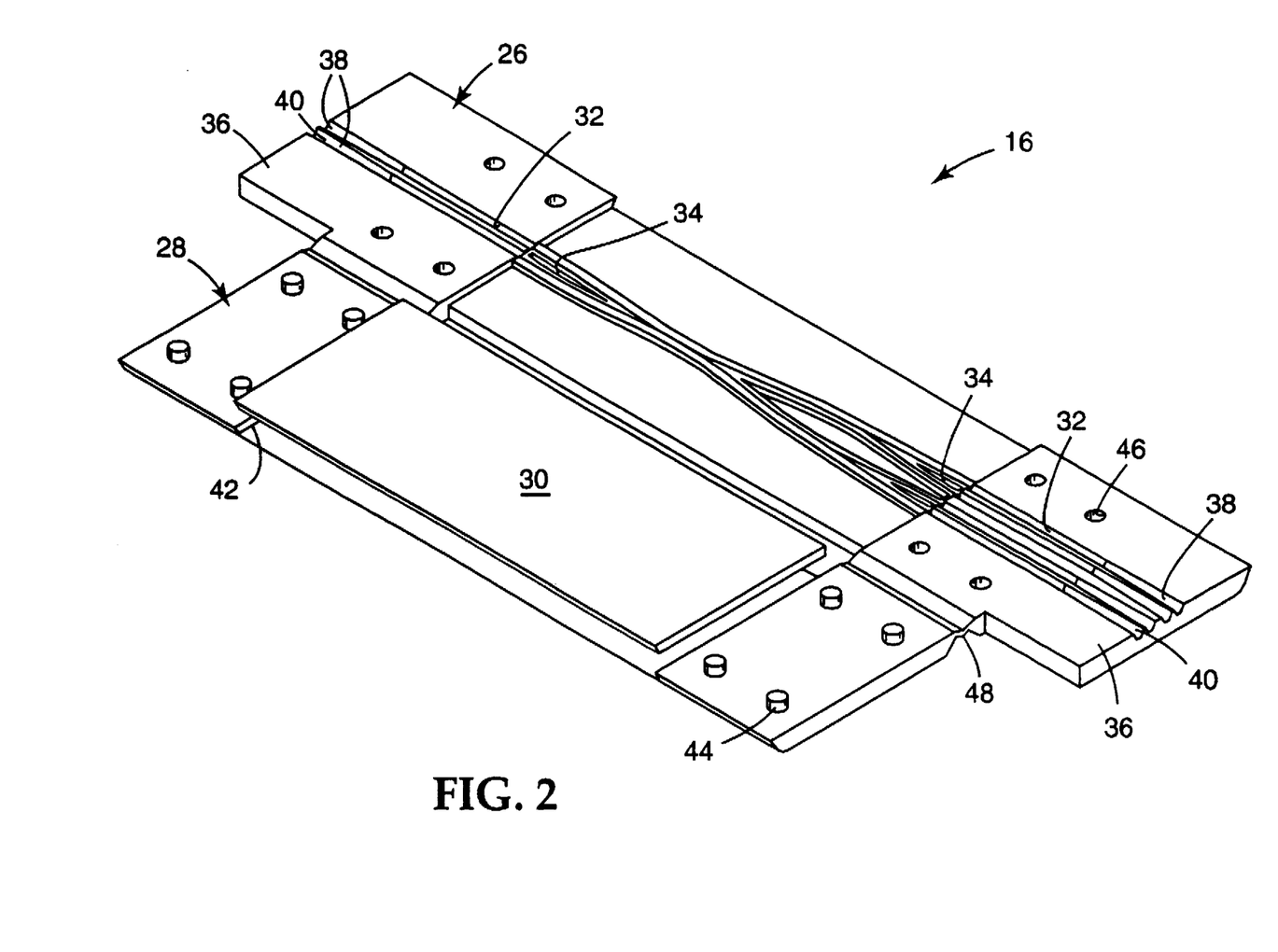
FIG. 2 is a perspective view of a waveguide element used according to the present invention, in its unassembled state, incorporating a 2×4 waveguide splitter.

With further reference to FIG. 2, splice/waveguide element 16, shown in an unassembled state, is described in further detail. In one embodiment of coupler 10, element 16 comprises three plates 26, 28 and 30 (preferably flat and rectangular). The bottom plate 26 has two splice areas, one at each end, with V-shaped, fiber alignment grooves 32 formed therein, and a central portion having a waveguide element including waveguide channels 34. Bottom plate 26 also has extensions or porch areas 36 with V-shaped, fiber-receiving grooves 38 formed therein. Fibers that are inserted into the splice typically have a buffer coating which is stripped from the terminal ends of the fibers, i.e., that portion of the fibers which lie in fiber alignment grooves 32. Fiber-receiving grooves 38 accordingly have a ramped portions 40 which accommodates the buffered portion of the optical fibers so as to minimize microbending of the fibers at the transition from the buffered portion thereof to the exposed portion thereof, and so help avoid optical losses associated with such microbending. Fiber-receiving grooves 38 are also wider than fiber alignment grooves 32 since they accommodate the buffered portion of the fibers. Those skilled in the art will appreciate that the shape of grooves 32 and 38 are not limited to "V" cross-sections, but in the preferred embodiment the grooves are V-shaped and have an interior angle of approximately 60°. In this manner, when a fiber is placed in one of the grooves and element 16 is assembled into the module housing, the points of contact between plates 26 and 30 and the fiber generally form an equilateral triangle which minimizes transverse offset of the fiber and thus further reduces signal loss.

Top plate 28 has a recess 42 which accommodates cover plate 30 when the plates are in the assembled state and cover plate 30 is interposed between bottom plate 26 and top plate 30. Top plate 28 may be partially secured to, and aligned with, bottom plate 26 by any convenient means, such as pegs 44 formed on top plate 28 which mate with holes 46 formed on bottom plate 26. In this assembled position, one or more fibers inserted into element 16 may be secured by sliding wedges 18, resulting in a clamping force on the fibers due to the tapered shape of the wedges. Wedges 18 are advantageously located adjacent fiber alignment grooves 32 so that they apply more clamping force near the waveguide channel/fiber interface than at the central portion of element 16. Of course, wedges 18 may be actuated independently, and so coupler 10 may be spliced initially at only one end, such as for pigtailing, and the other splice completed later in the field.

Bottom plate 26 may be microreplicated from any durable material, preferably one which is sufficiently hard to avoid excess deformation of the grooves when the fibers are clamped therein, including materials from the group consisting of polymers, halogenated polymers, polymer/ceramic composites, or ceramics, including transparent, optical quality glass. Microreplication is accomplished using methods which include injection molding, transfer molding, embossing, or cast-and-cure. See, e.g., U.S. Pat. Nos. 5,311, 604 and 5,343,544. It is preferable to use a material such as halogenated polymers since they typically exhibit lower optical losses. Similar materials may be used to fill the waveguide channels, i.e., forming the waveguide cores. Top plate 28 may be, but is not necessarily, integrally formed with bottom plate 26, and connected thereto with a "focus hinge" 48 as described in the '787 patent. Cover plate 30 may also be formed of the same material as bottom and top plates 26 and 30.

Figure 3:
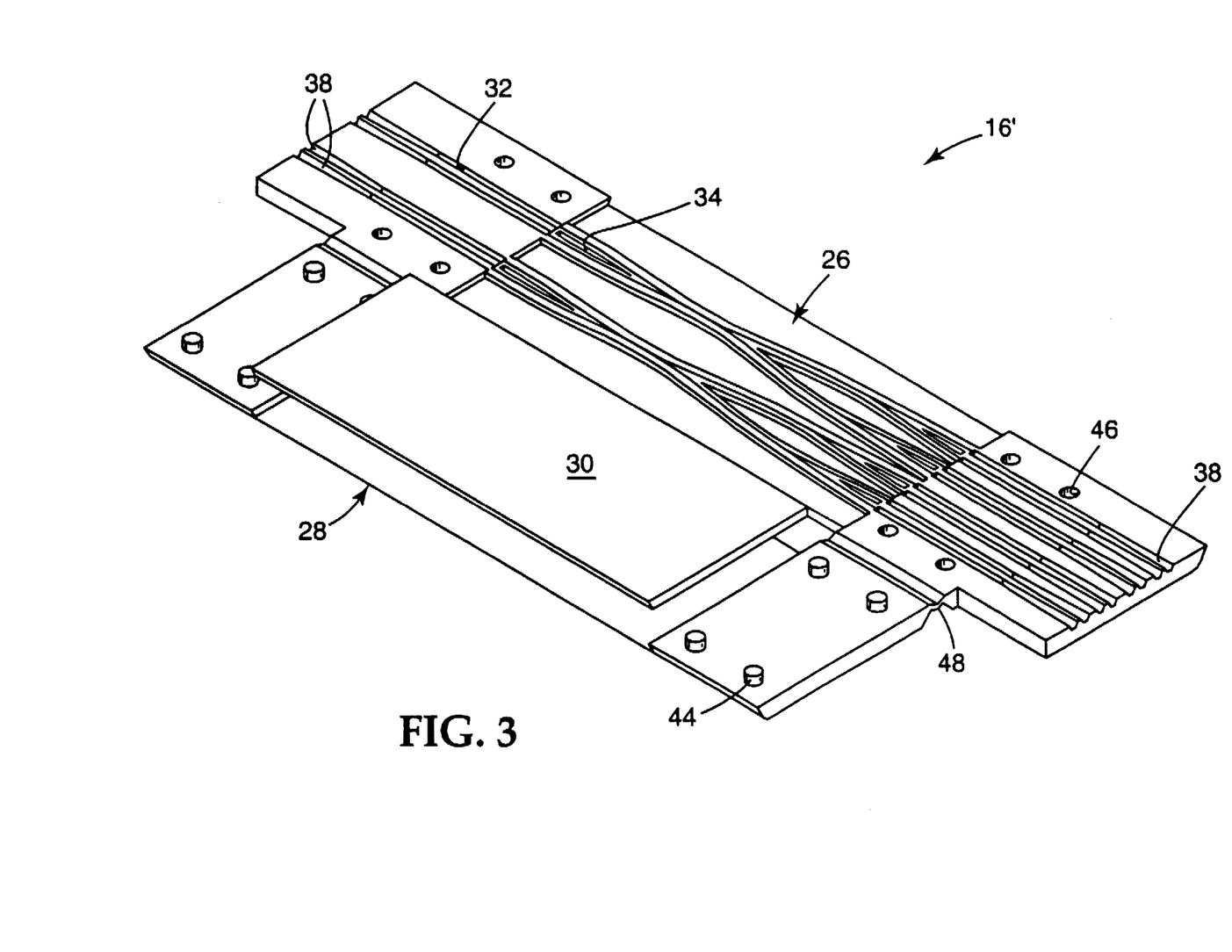
FIG. 3 is a perspective view of an alternative embodiment of the waveguide element of the present invention incorporating multiple optical devices on a single element.

In the embodiment of FIG. 2, the waveguide element formed on the central portion of plate 26 is a 2×4 splitter where the two input channels are split into four output channels. More generally, the present invention contemplates an n×m coupler wherein n and m are, independently, integers having a value between 1 and 1024, inclusive. Other n×m configurations will become apparent to those skilled in the art, such as multiple couplers on a single waveguide element. Similarly, different types of optical modules may be provided, such as a splitter, a star coupler, a wavelength division multiplexer, an attenuator, an optical filter, a phase modulator or an optical tap, and even combinations of these devices may be microreplicated on a single waveguide element, side-by-side, end-to-end or in a variety of tree structures. For example, FIG. 3 depicts an alternative splice/waveguide element 16' wherein two 2×4 splitters are fabricated side-by-side on a single waveguide element. Preferably, the input and output grooves are on equal centers to facilitate the interconnection of a multiplicity of fibers in a single operation.

Figure 4:
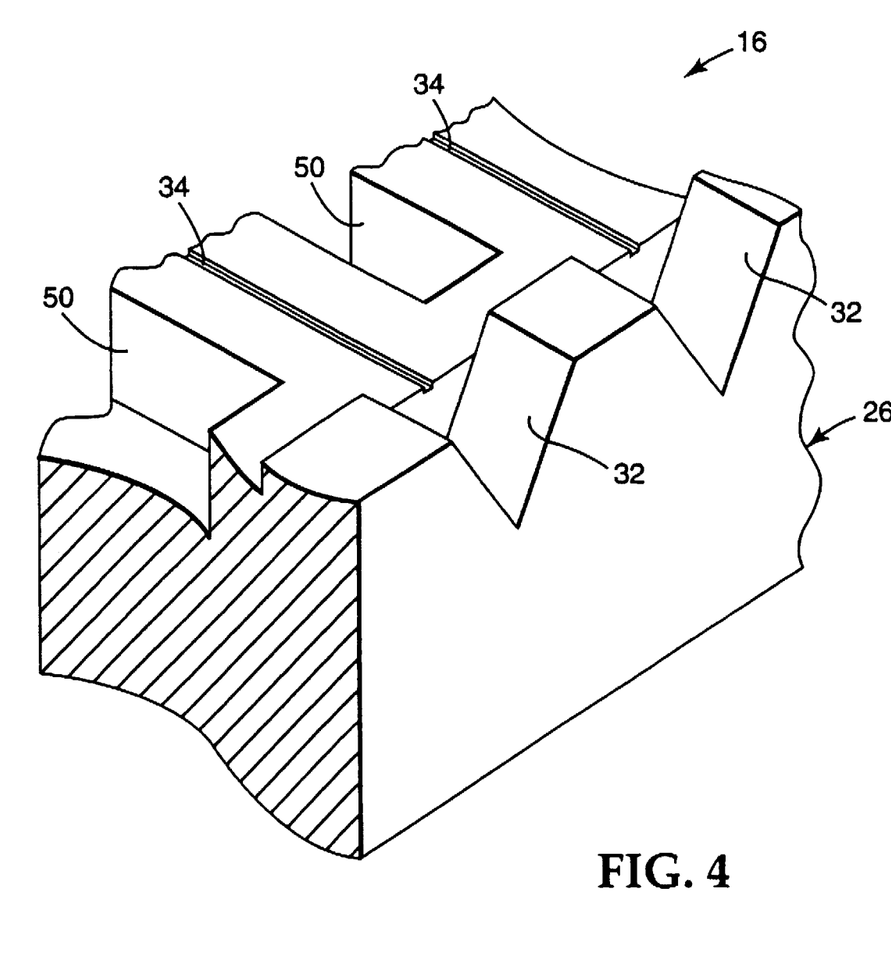
FIG. 4 is a perspective view of the fiber groove-waveguide channel detail of the waveguide element of FIG. 2.

Referring now to the enlarged view of FIG. 4, the cores of the optical fibers may be precisely aligned with the waveguide channels 34 by aligning the channels on the centers of the V-grooves during microreplication. For single-mode applications, the waveguide channels are approximately 8 microns wide and deep, with the V-groove formed to align the optical axis of the fiber and waveguide channel with an accuracy on the order of 0.5 micron. While the fiber alignment groove/channel interface is shown as a surface perpendicular to the fiber axis, it may alternatively be molded at a slight angle from the perpendicular, say 3 to 10 degrees, to reduce back reflections at the interface to less than −50 dB for typical molded polymeric materials over a temperature range of −40° to +75° C. Index matching gel may optionally be used to further decrease insertion losses. Also shown in FIG. 4 are flow channels 50 which may receive excess liquid monomer during the channel-forming process as explained further below.

Figure 5:
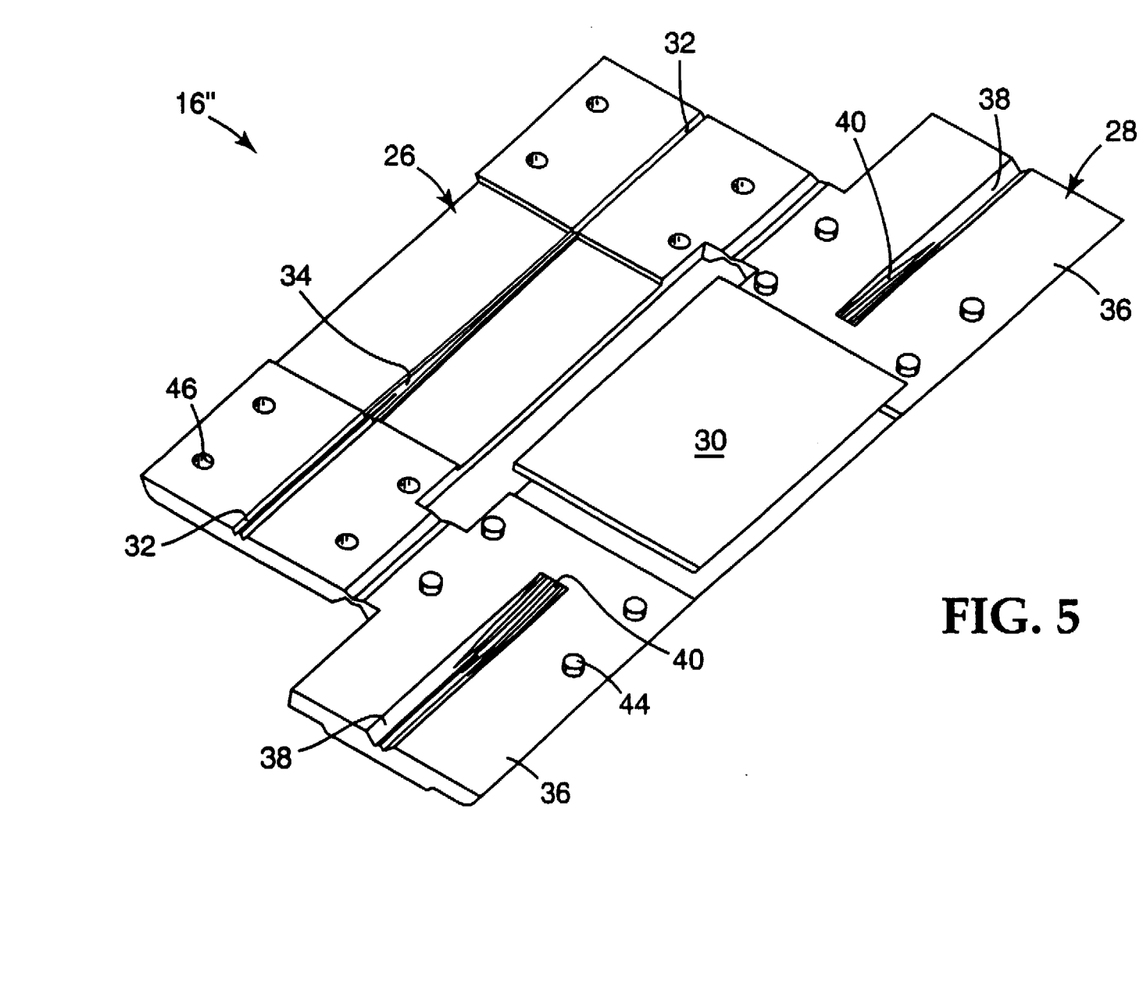
FIG. 5 is a perspective view of another alternative embodiment of a waveguide element used in the optical module of the present invention, also shown in an unassembled state.
Figure 6:
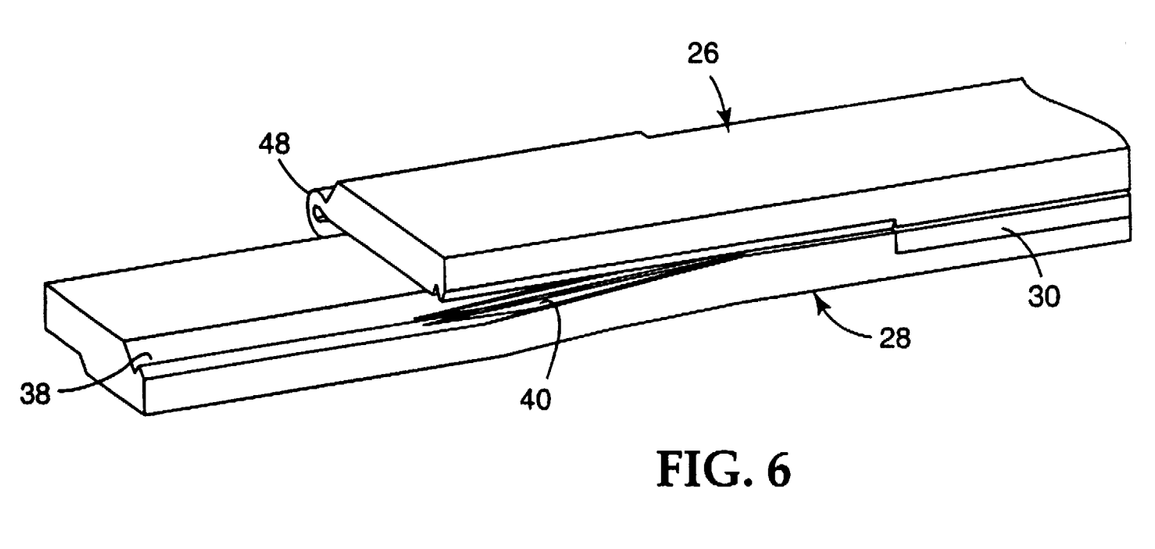
FIG. 6 is a perspective view of the waveguide element of FIG. 5, shown in section, and in its assembled state.

In FIGS. 2–4, all fiber insertion grooves, fiber alignment grooves, and waveguide channels are molded on the bottom plate 26, with the top plate 28 incorporating recess 42 for cover plate 30. FIGS. 5 and 6 depict another embodiment 16" of the splice/waveguide element of the present invention wherein fiber insertion grooves 38 and ramps 40 are molded on top plate 28, with fiber alignment grooves 32 and waveguide channels 34 still molded on bottom plate 26. Fibers inserted into grooves 38 are guided up ramps 40 and into alignment grooves 32 where they are aligned with waveguide channels 40. A partial view of the assembled splice/waveguide element 16" is shown in FIG. 6 which illustrates the relationship of the fiber insertion grooves, ramp and fiber alignment grooves, and the bottom, top and cover plates.

Figure 7:
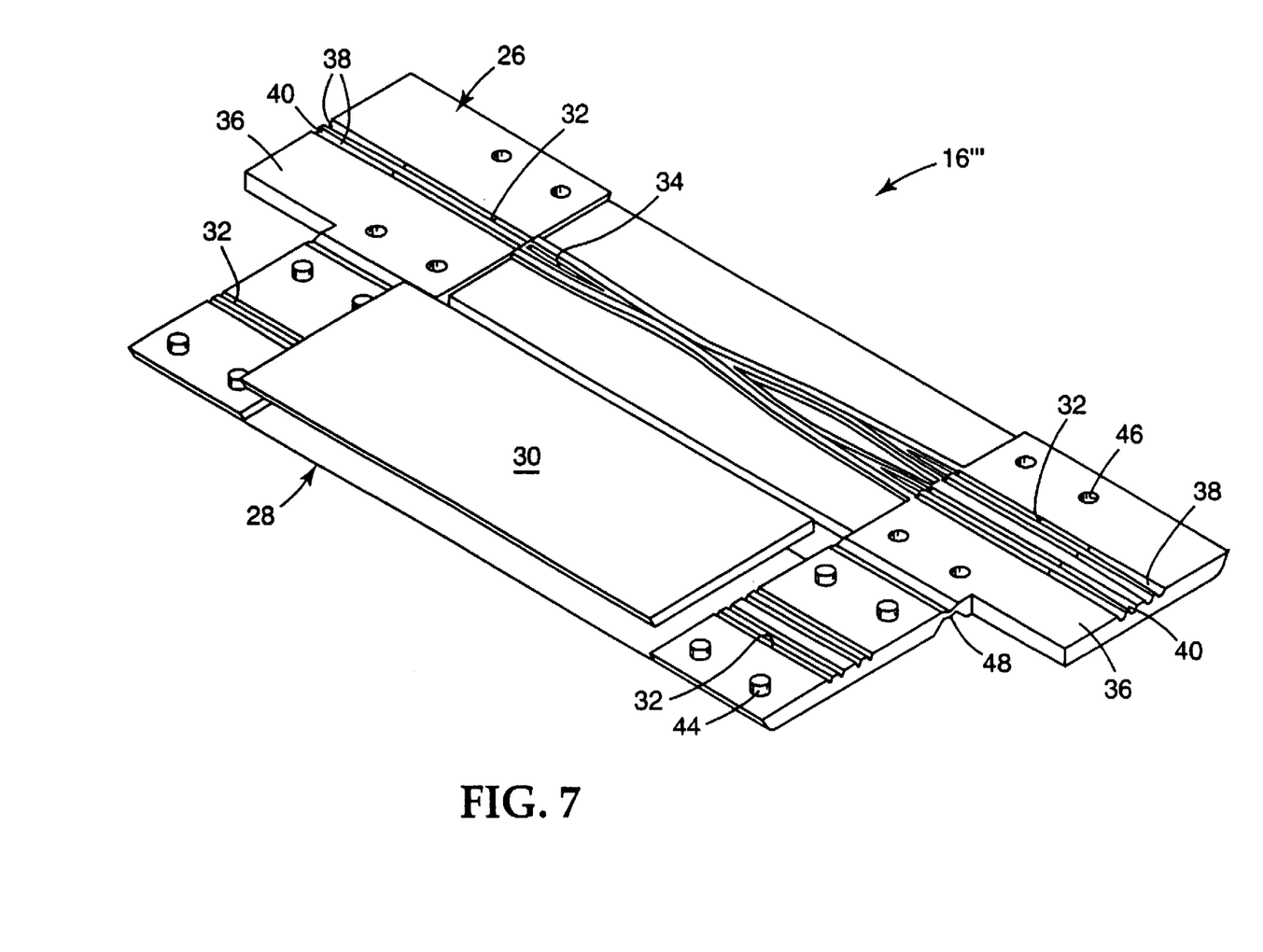
FIG. 7 is a perspective view of yet another embodiment of the waveguide element of the present invention, with fiber insertion and alignment grooves being molded into both the top and bottom plates.
Figure 8:
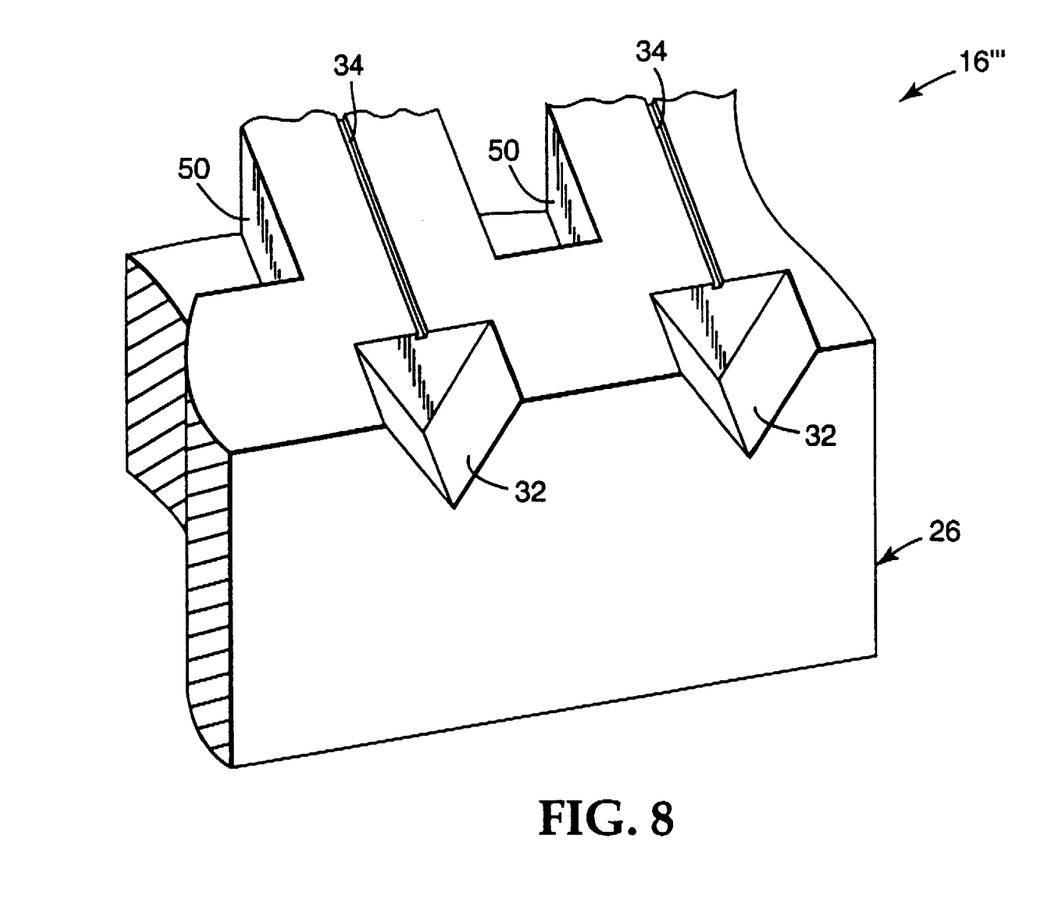
FIG. 8 is a perspective view of the fiber groove-waveguide channel detail of the bottom plate of the waveguide element of FIG. 7.

Yet another embodiment 16'" of the splice/waveguide element of the present invention in shown in FIGS. 7 and 8. In element 16'", fiber alignment grooves 32 are formed in both bottom plate 26 and top plate 28, and are aligned by pegs 44 and holes 46. FIG. 8 reveals how, in this embodiment, waveguide channels 34 are formed with a top surface which is coplanar with the top surface of V-grooves 32. Channels 34 are preferably molded only in bottom plate 26, with fiber alignment grooves formed so as to center the fiber axis to the optical axis of the waveguide channels, i.e., the V-grooves on bottom 26 are only slightly deeper than those on top plate 28. The channel/groove interface may again be molded at angle to reduce back reflections. Index matching gel may also be preloaded at the interface. Fibers whose terminal ends are beveled may be positioned against channels 34 and exhibit acceptable losses without gel if direct contact between the fiber core and the channel is achieved.

All of the foregoing embodiments of the splice/waveguide element preferably use waveguide channels 34 which are formed by polymerizing a monomer in situ. Following molding of the splice/waveguide element using the desired material, inserts (not shown) are placed into bottom plate 26, seated against the openings to the waveguide channels. These inserts are shaped to fit fiber-receiving grooves 38 and fiber alignment grooves 32. A liquid monomer, such as a fluorinated acrylate, or other curable material, is applied to the waveguide channels to form cores therein. Cover plate 30 is placed firmly onto bottom plate 26, centered on the central portion thereof forming the waveguide element. As cover plate 30 is pressed onto bottom plate 26, residual monomer is forced out of the waveguide channels and into flow channels 50. This allows the channels to be filled to a precise depth without residual material forming a thin layer above the channel waveguides. The liquid monomer or other material is cured to form the cores of the waveguide channels and causes plates 26 and 30 to adhere to each other. The inserts are removed from the fiber-receiving and fiber alignment grooves. Top plate 28 is placed (hinged) on top of cover plate 30, with plate 30 fitting into recess 42, and pegs 44 fitting into holes 46.

Although the depicted waveguide channels 34 are shown with the same width, differing widths may be microreplicated on a single waveguide element. For instance, Y-branches which divide a single channel into two channels of differing widths are known to provide unequal splitting of the optical signal between the two output channels. In addition, surface corrugation waveguide gratings may also be microreplicated in the same waveguide element as the channel waveguides, to provide both broadband and narrowband optical filtering which can effect optical wavelength multiplexing.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, fiber stubs could be preloaded in the splice/waveguide element, in the fiber-receiving grooves, aligned with the waveguide cores and held in place by epoxy or other curable materials, including polymers and ceramics; these fiber stubs would then be spliced to the input and output fibers. It is therefore contemplated that such modifications can be made without departing from the spirit or scope of the present invention as defined in the appended claims.

We claim:

1. An article for interconnecting at least one optical fiber with at least one other optical fiber, comprising:
    an optical element comprising a bottom plate and a top plate, said optical element having first and second ends and at least one waveguide channel therein filled with an optically transmissive material, said waveguide channel having first and second ends;
    first splice means, integrally formed in said optical element, for receiving a first optical fiber at said first end of said optical element, and aligning the first optical fiber with said first end of said waveguide channel;
    second splice means, integrally formed in said optical element, for receiving a second optical fiber at said second end of said optical element, and aligning the second optical fiber with said second end of said waveguide channel; and
    a jacket having a longitudinal slot for receiving said optical element and first and second wedges, said jacket including first and second caps for receiving said first and second ends, respectively, of said optical element and retaining said first and second wedges in said jacket.

2. The article of claim 1 wherein said optical element includes means adapted to provide one of a plurality of different functions selected from the group consisting of a coupler, a splitter, a star coupler, a wavelength division multiplexer, an attenuator, an optical filter, a phase modulator or an optical tap.

3. The article of claim 1 wherein said first splice means receives the first optical fiber in a remateable fashion.

4. The article of claim 1 wherein said material filling said waveguide channel is selected from the group consisting of polymers, halogenated polymers, polymer/ceramic composites, or ceramics.

5. The article of claim 1 wherein said optical element is formed from a material selected from the group consisting of polymers, halogenated polymers, polymer/ceramic composites, or ceramics.

6. The article of claim 1 wherein said optical element has at least one fiber alignment groove at each of said ends, and a central portion with said at least one waveguide channel, said first and second ends of said waveguide channel aligned, respectively, with said fiber alignment grooves.

7. The article of claim 2 wherein:
    said first splice means includes
    n fiber-receiving grooves formed at said first end of said optical element, and
    n fiber alignment grooves having first and second ends, said first ends thereof being generally aligned with said n fiber-receiving grooves, respectively;
    said second splice means includes
    m fiber-receiving grooves formed at said second end of said optical element, and
    m fiber alignment grooves having first and second ends, said first ends thereof being generally aligned with said m fiber-receiving grooves, respectively; and
    said optical element comprises an n×m coupler, and includes
    n waveguide channels which divide or converge into m waveguide channels, said n waveguide channels being generally aligned with said second ends of said n fiber alignment grooves, respectively, and said m waveguide channels being generally aligned with said second ends of said m fiber alignment grooves, respectively,
    where n and m are, independently, integers from 1 to 1,024 inclusive.

8. The article of claim 4 wherein said material filling said waveguide channel is a transparent, optical quality glass.

9. The article of claim 5 wherein said material forming said optical element is a transparent, optical quality glass.

10. The article of claim 1 wherein said jacket includes first and second end covers attached to said first and second caps, respectively.

11. The article of claim 6 further comprising at least one fiber stub located on said optical element, said fiber stub having first and second ends, said first end of said fiber stub being aligned with said first end of said waveguide channel, and said second end of said fiber stub being aligned with a respective one of said fiber alignment grooves.

12. The article of claim 6 further comprising
    a cover plate interposed between said bottom and top plates, said top plate having a recess for receiving said cover plate.

13. The article of claim 6 wherein:
    one of said fiber alignment grooves has an alignment axis; and
    said bottom plate has a surface formed at an interface between said one fiber groove and said waveguide channel, said surface being oriented at an angle which is not orthogonal with said alignment axis.

14. The article of claim 7 wherein:
    said waveguide channels define an upper surface; and
    said fiber-receiving grooves have a height which extends above said upper surface of said waveguide channels such that a core of each waveguide channel is aligned with a center of its respective fiber-receiving groove.

15. The article of claim 12, wherein said wedges cause said bottom plate to be forcibly urged against said top plate when said wedges are in an actuated state.

16. The article of claim 12 wherein said bottom and cover plates are adhered to each other by a polymerizable material which also forms a core of said waveguide channel.

17. The article of claim 15 wherein:

said fiber alignment grooves and said waveguide channel define respective fiber/channel interfaces; and said wedges apply more clamping force at said fiber/channel interfaces than at said central portion of said optical element.

18. An optical coupler comprising:

an optical element having first and second ends, and a central portion;

an optical waveguide integrally formed on said central portion of said optical element, said waveguide including n waveguide channels which divide or converge into m waveguide channels, all of said channels being filled with an optically transmissive material, where n and m are, independently, integers from 1 to 1,024 inclusive;

first splice means, integrally formed on said optical element at said first end thereof, for receiving at least a first optical fiber, and aligning the first optical fiber with one of said n waveguide channels, said first splice means including m fiber-receiving grooves formed at said first end of said optical element, and n fiber alignment grooves having first and second ends, said first ends thereof being generally aligned with said n fiber-receiving grooves, respectively, and said second ends of said n fiber alignment grooves being generally aligned with said n waveguide channels;

second splice means, integrally formed on said optical element at said second end thereof, for receiving at least a second optical fiber, and aligning the second optical fiber with one of said m waveguide channels, said second splice means including m fiber-receiving grooves formed at said first end of said optical element, and m fiber alignment grooves having first and second ends, said first ends thereof being generally aligned with said m fiber-receiving grooves, respectively, and said second ends of said m fiber alignment grooves being generally aligned with said m waveguide channels; and a jacket having a longitudinal slot for receiving said optical element and first and second wedges, said jacket including first and second caps for receiving said first and second ends, respectively, of said optical element and retaining said first and second wedges in said jacket.

19. The optical coupler of claim 18 wherein:

said first splice means receives the first optical fiber in a remateable fashion; and said second splice means receives the second optical fiber in a remateable fashion.

20. The optical coupler of claim 18 wherein each of said waveguide channels are formed by microreplication of said optical element.

21. The optical coupler of claim 20 wherein said optical element comprises a first plate having first and second ends, and further comprising:

a second plate;

a third plate interposed between said first and second plates, said second plate having a recess for receiving said third plate; and wherein said wedges cause said second plate to be forcibly urged against said first plate when said wedges are in an actuated state.

22. The optical coupler of claim 21 wherein said first and third plates are adhered to each other by a polymerizable material which also forms a core of each of said waveguide channels.

23. A microreplicated optical module comprising:

a first plate having first and second ends, and a central portion;

an optical waveguide element integrally formed on said central portion of said first plate, said waveguide element including n waveguide channels which divide or converge into m waveguide channels, all of said channels being filled with an optically transmissive material, where n and m are, independently, integers from 1 to 1,024 inclusive, each of said waveguide channels being formed by microreplication of said waveguide element;

a first splice element, integrally formed on said first plate at said first end thereof, for receiving at least a first optical fiber in a remateable fashion, and aligning the first optical fiber with one of said n waveguide channels, said first splice element including n fiber-receiving grooves formed at said first end of said first plate, and n fiber alignment grooves having first and second ends, said first ends thereof being generally aligned with said n fiber-receiving grooves, respectively, and said second ends of said n fiber alignment grooves being generally aligned with said n waveguide channels;

a second splice element, integrally formed on said first plate at said second end thereof, for receiving at least a second optical fiber in a remateable fashion, and aligning the second optical fiber with one of said m waveguide channels, said second splice element including m fiber-receiving grooves formed at said first end of said first plate, and m fiber alignment grooves having first and second ends, said first ends thereof being generally aligned with said m fiber-receiving grooves, respectively, and said second ends of said m fiber alignment grooves being generally aligned with said m waveguide channels;

a second plate;

a third plate interposed between said first and second plates, said second plate having a recess for receiving said third plate, and said first and third plates being adhered to each other by a polymerizable material which also forms a core of each of said waveguide channels;

a housing surrounding said first, second and third plates, said waveguide element, and said first and second splice elements; and first and second means, attached to said housing, for independently actuating said first and second splice elements, respectively, said actuating means causing said second plate to be forcibly urged against said first plate when said actuating means is in an actuated state, thereby clamping any fiber positioned in said fiber-receiving grooves.

\* \* \* \* \*